United States Patent [19]

Stella

[11] Patent Number: 4,657,414
[45] Date of Patent: Apr. 14, 1987

[54] ROLLER BEARING WITH LUBRICANT RESERVOIR

[75] Inventor: Leo Stella, Bristol, Conn.

[73] Assignee: The Torrington Company, Torrington, Conn.

[21] Appl. No.: 832,017

[22] Filed: Feb. 24, 1986

[51] Int. Cl.⁴ .................. F16C 19/26; F16C 33/66; F16C 33/58

[52] U.S. Cl. .................. 384/548; 384/473; 384/563; 384/564

[58] Field of Search ............ 384/462, 473, 477, 480, 384/488, 548, 563, 564, 569, 606, 622

[56] References Cited

U.S. PATENT DOCUMENTS

| | | | |
|---|---|---|---|
| 2,620,243 | 12/1952 | Beatty, Jr. | 384/477 |
| 3,001,458 | 8/1971 | Farrell | 384/564 |
| 3,038,766 | 6/1962 | Altson | 384/473 X |

FOREIGN PATENT DOCUMENTS 2202272  8/1972  Fed. Rep. of Germany ...... 384/548

Primary Examiner—Stuart S. Levy
Assistant Examiner—Thomas R. Hannon
Attorney, Agent, or Firm—Frank S. Troidl

[57] ABSTRACT

An outer cup made from flat sheet metal encloses an inner cup also made from flat sheet metal. The inner cup has an open end adapted to receive the end of a rotatable member, such as a shaft. The other end of the inner cup has a closed end axially spaced from the closed end of the outer cup to provide a lubricant reservoir in communication with the rollers in the annular space between the cups.

4 Claims, 4 Drawing Figures

ROLLER BEARING WITH LUBRICANT RESERVOIR

This invention relates to anti-friction bearings. More particularly this invention is a new roller bearing of the type used to support the end of a shaft.

Briefly described, the new bearing comprises an outer cup made from flat sheet metal, and having an annular side wall, an open end, and a closed end. An inner cup made from flat sheet metal is enclosed within the outer cup. The inner cup also has an annular side wall of less diameter than the diameter of the outer cup side wall to provide an annular space between the outer cup and the inner cup side walls. The inner cup also has an open end adapted to receive the end of a rotatable member, such as a shaft, and a closed end axially spaced from the outer cup closed end to provide a lubricant reservoir in communication with the annular space between the two cups. Rollers are located in the annular space.

The invention, as well as its many advantages, may be further understood by reference to the following detailed description and drawings in which.

In the various figures, like parts are referred to by like numbers.

Figure 1:
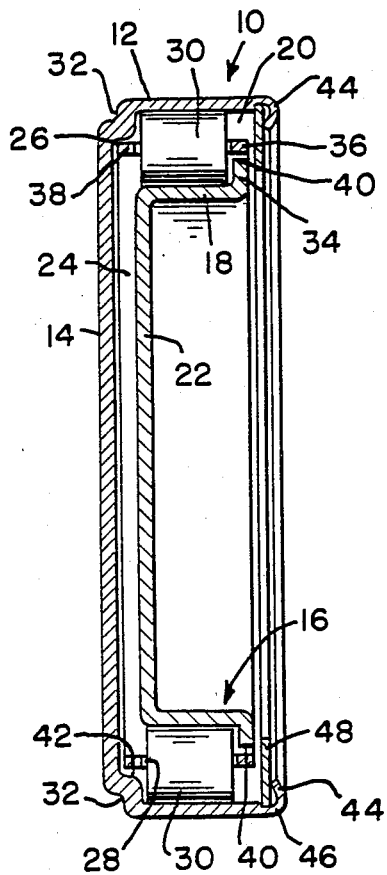
FIG. 1 is an axial section of one preferred embodiment of the invention.

Referring to the drawings and more particularly to FIG. 1, an outer cup 10 is made from flat sheet metal. The outer cup has an annular side wall 12 and a closed end 14. The other end of the outer cup 10 is open ended to receive an inner cup 16, which is also made from flat sheet metal, and enclosed within the outer cup 10.

The inner cup 16 has an annular side wall 18 of less diameter than the diameter of the outer cup annular side wall 12 thus providing an annular space 20 between the outer cup and the inner cup side walls. The inner cup 16 has an open end adapted to receive the end of a rotatable member, such as a shaft, and a closed end 22 axially spaced from the outer cup closed end 14 to provide a lubricant reservoir 24 in communication with the annular space 20.

An annular member, such as a separator 26, is positioned in the annular space 20. The separator 26 has a plurality of circumferentially separated pockets 28 with each pocket containing a roller 30. The inner surface of annular wall 12 on outer cup 10 and the outer surface of annular wall 18 on inner cup 16 provide the outer and inner raceways, respectively, for the rollers 30.

An annular shoulder 32 interconnects the inner surface of the outer cup side wall 12 and the outer cup closed end 14. The inner cup 16 is provided at its open end with a radially outwardly extending annular flange 34. The inside diameters of the end rings 36 and 38 of the separator 26 are slightly larger than the diameter of the outer surface 40 of the inner cup flange 34. The outside diameters of the end rings 36 and 38 are slightly less than the inside diameter of the axially extending surface 42 of the outer cup annular shoulder 32. Thus, the axially extending surface 42 of shoulder 32 on the outer cup 10 and the axially extending outer surface 40 of the flange 34 on the inner cup 16 serve to pilot the outer surface of the end ring 38 and the inner surface of the end ring 36, respectively, to keep the separator 26 in its concentric position.

The outer cup 10 has a radially inwardly curled portion 44 at its open end. The inside surface of the outer cup 10 is provided with a annular shoulder 46 adjacent the outer cup 10 open end. A washer 48 is axially positioned and held in place by the inwardly curled portion 44 pressing the washer 48 against the annular shoulder 46. The inside diameter of the washer 48 is less than the diameter of the outside surface 40 of the flange 34 so that the solid portion of the annular washer extends radially from the outer cup 10 toward the axis of the bearing with a portion of the solid portion of the washer overlapping the inner cup flange 34. The washer shields or seals the bearing from outside contamination, retains the lubricant in the bearing, and retains the assembly.

Figure 2:
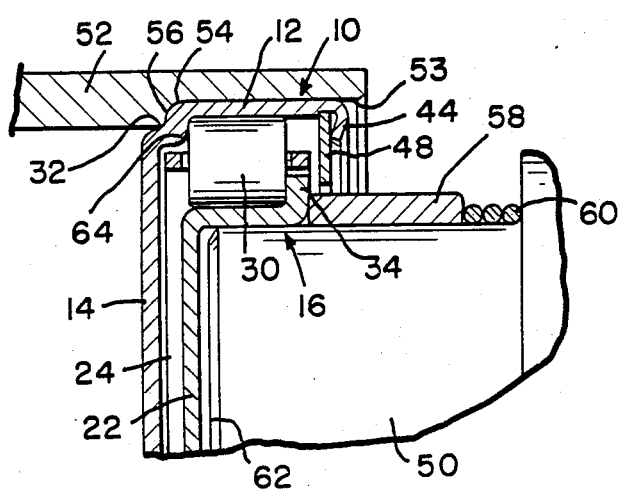
FIG. 2 is a fragmentary view, partly in axial section, showing the preferred embodiment of FIG. 1 mounted in a housing and supporting the end of a rotatable shaft with axial thrust applied against the inner cup.

As shown in FIG. 2, the bearing may be used to support the end of a shaft 50 in a housing 52. The outside surface of the outer cup 10 is pressed into the counterbore 53 with the annular shoulder 54 of the annular wall 12 abutting against the bottom annular surface 56 of the counterbore. A sleeve 58 which is biased against the flange 34 by coil spring 60 is mounted about the shaft 50. The end 62 of the shaft 50 is axially spaced from the inside surface of the closed end 22 of the inner cup. Thus, the bearing of FIG. 2 allows axial thrust to be applied against the annular flange 34 of the inner cup through the rollers 30 and against the radially extending surface 64 of the shoulder 32.

Figure 3:
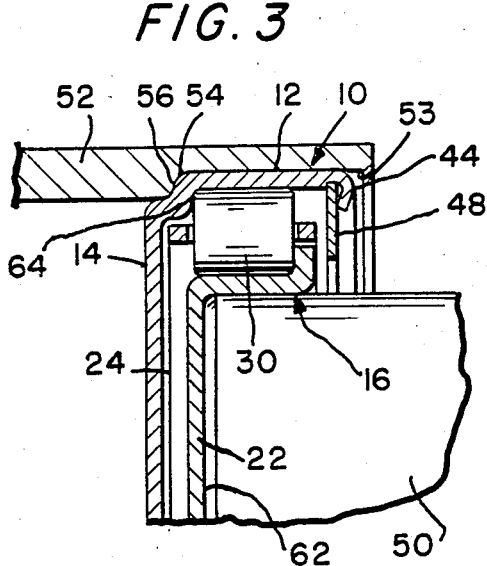
FIG. 3 is a fragmentary view, partly in section, illustrating the use of the preferred embodiment of FIG. 1 mounted in a housing and supporting a shaft with the end of the shaft applying axial thrust against the closed end of the inner cup.

In the embodiment shown in FIG. 3, the end 62 of the shaft 50 abuts against the inside surface of the closed end wall 22 of the inner cup 16. Thus, the axial thrust is applied against the inner cup closed end 22.

Figure 4:
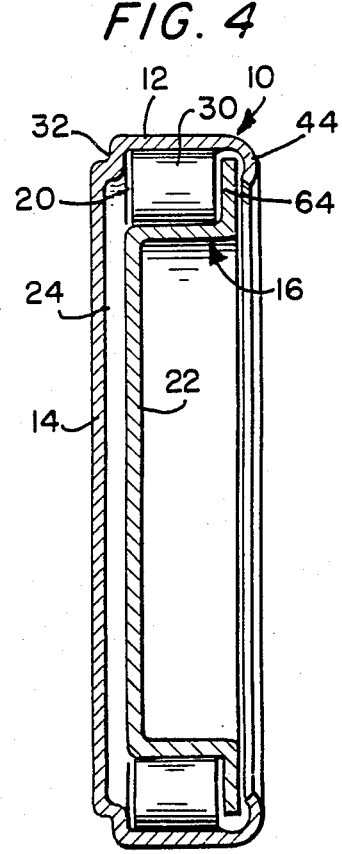
FIG. 4 is an axial section of a second preferred embodiment of the invention.

The bearing shown in FIG. 1 through FIG. 3 includes a separator to provide guidance for high speed operation. The embodiment shown in FIG. 4 is used with a full complement of rollers eliminating the separator. The embodiment of FIG. 4 is used when slow speeds and heavier loads are encountered.

In the embodiment of FIG. 4 there is no necessity for a retaining washer. The inner cup flange 64 extends radially outwardly to adjacent the inside surface of the outer cup annular wall 12. The inner cup 16 is enclosed within the outer cup 10 by the radially inwardly curled portion 44 of the outer cup 10 with a close clearance between the curled portion 44 and the inner cup flange 64 to provide lubricant sealing.

I claim:

1. A bearing comprising: an outer cup made from flat sheet metal having an annular side wall, an open end, a closed end and an annular shoulder interconnecting the annular side wall and the closed end, the shoulder having a radially inwardly extending surface and an axially extending surface; an inner cup made from flat sheet metal enclosed within the outer cup, and having an annular side wall of less diameter than the diameter of the outer cup side wall to provide an annular space between the outer cup and the inner cup sidewall, the inner cup also having an open end adapted to receive the end of a rotatable member, a closed end axially spaced from the outer cup closed end to provide a lubricant reservoir in communication with said annular space, and a radially outwardly extending flange at its open end, said flange having an axially extending radially outer surface; and rollers located in said annular space, the axial ends of each roller being normally spaced from said outer cup radially extending surface and said inner cup flange, and upon the application of an axial thrust, the inner cup flange contacts one axial end of each roller and the outer cup radially extending surface contacts the other axial end of each roller.

2. A bearing in accordance with claim 1 wherein: the inner cup is enclosed within the outer cup by a radially inwardly curled portion at the outer cup open end with a close clearance between said curled portion and the inner cup flange to provide lubricant sealing.

3. A bearing in accordance with claim 1 wherein: an annular member having circumferentially separated pockets and two axially separated end rings is positioned in said annular space, a roller is located in each pocket, the axially extending surface of the outer cup annular shoulder and the axially extending radially outer surface of the inner cup flange serving to pilot the outer surface of one end ring and the inner surface of the other end ring, respectively, to keep the annular member in its concentric position.

4. A bearing in accordance with claim 3 wherein: the outer cup has a shoulder on the inside surface of its annular side wall adjacent its open end and a radially inwardly curled portion at its open end; a washer is axially positioned and held in place by said annular side wall shoulder and the inwardly curled portion, the washer radially overlapping the inner cup flange to enclose the inner cup within the outer cup.

* * * * *